T. C. HOWLAND.
SQUARE.
APPLICATION FILED MAR. 15, 1909.
927,972. Patented July 13, 1909.
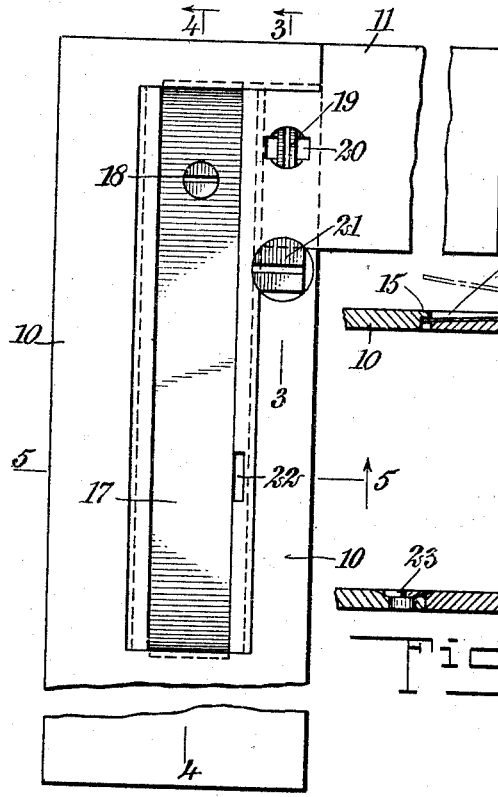
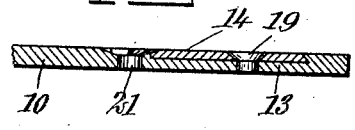
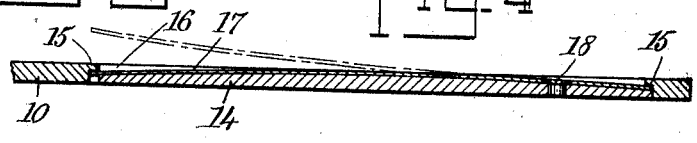
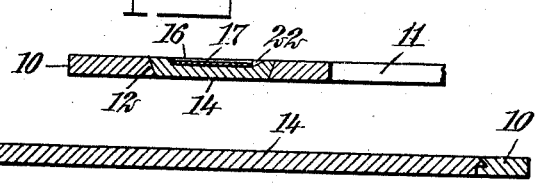
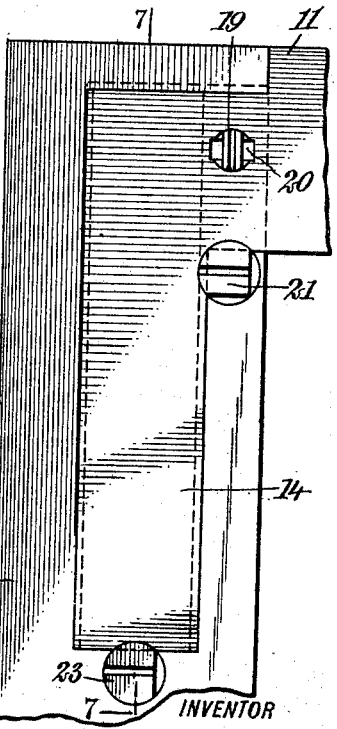
WITNESSES
INVENTOR
Thomas C. Howland
BY
ATTORNEYS

UNITED STATES PATENT OFFICE.

THOMAS C. HOWLAND, OF LOCH ARBOR, NEW JERSEY.

SQUARE.

No. 927,972.  Specification of Letters Patent.  Patented July 13, 1909.

Application filed March 15, 1909. Serial No. 483,476.

*To all whom it may concern:*

Be it known that I, THOMAS C. HOWLAND, a citizen of the United States, and a resident of Loch Arbor, in the county of Monmouth and State of New Jersey, have invented a new and Improved Square, of which the following is a full, clear, and exact description.

The invention is an improvement in squares of the character embodying separable arms, and has in view a construction in which one of the arms is provided with a longitudinal slot isolated from the outer edges thereof, and provided with a groove at one side extending from the slot through the inner side edge, said slot being relatively wider at the side of the square having the groove than at the opposite side, the other arm of the square having an end portion to fit into said slot and groove, and screws or similar revoluble devices carried by one of the arms and having heads movable into engagement with the other arm and thus locking the two arms together.

The preferred form of the square further includes a flat spring operating to press that portion of one of the arms within the slot of the other arm, to its seat and preventing possible play between the parts.

Reference is to be had to the accompanying drawings forming a part of this specification, in which similar characters of reference indicate corresponding parts in all the views.

Figure 1 is a face view of a square embodying my invention; Fig. 2 is a perspective view of the two arms when disassembled; Fig. 3 is a section on the line 3—3 of Fig. 1, looking in the direction of the arrow; Fig. 4 is a section on the line 4—4 of Fig. 1; Fig. 5 is a section on the line 5—5 of Fig. 1; Fig. 6 is a face view of a modified construction of the square; and Fig. 7 is a section on the line 7—7 of Fig. 6.

In constructing the arms 10 and 11 of the square so that they may be readily assembled and detached and accurately and positively joined and secured together, I provide the arm 10 with a longitudinal slot 12, of substantial length, adjacent to one end of the arm but isolated from the edges thereof, and further construct it with a groove 13 of a depth equal to about one-half the thickness of the square, extending from the outer end of the slot to the inner side edge of the arm. The other arm 11 of the square I construct with an end portion 14 to snugly fit and conform to the slot 12 and the groove 13, that portion fitting within the slot extending at right-angles to the arm 11, and that portion fitting within the groove being cut out on its under face to admit of the two arms being flush at both sides when they are properly assembled. As best shown in Fig. 5, the edges of the slot 12 and portion 14 of the arm 11 have inclined or bevel edges, making the slot 12 wider at that side of the square having the groove 13 than at the opposite and under side, this feature of construction providing a seat for the portion 14 of the arm 11, on the arm 10, and preventing the said portion from falling through the slot 12. In that form of the invention shown in Figs. 1 to 5 inclusive, that edge of the groove 13 adjacent to the outer end of the arm 10 is undercut or dovetailed; and at the opposite side of the arm, notches or undercut portions 15 are formed at each end of the slot 12. The portion 14 of the arm 11 is grooved longitudinally, as indicated at 16, on its upper face, with the bottom of the groove tapering downwardly from the center toward each end, as shown in Fig. 4.

Arranged within the groove 16 is a flat spring 17 secured near one end thereof to the portion 14 by a screw 18. The ends of the spring project slightly beyond each end of the portion 14 of the arm 11, and that part of the portion 14 which fits within the groove 13 is beveled at its outer edge to fit and conform to the dovetailed edge of this groove. Engaged in the base of the groove 13 is a screw 19, the head of which when in one position is adapted to pass through an elongated opening 20 formed in the portion 14, and when turned at right-angles to this position, locking the two arms of the square together, as shown in Figs. 1 and 6. A further locking screw 21 is threaded in the arm 10 adjacent to the slot 12 and groove 13, and is provided with a head, in one position, as shown in Fig. 2, admitting of the assembling of the two arms of the square, and in another position, as shown in Figs. 1 and 6, overlying and bearing on the portion 14 of the arm 11.

In assembling the arms of the square, the portion 14 is first engaged with the outer edge of the slot and groove, for which purpose the arm 11 is held in a downwardly and outwardly-inclined position relatively to the arm 10, and the outer end of the spring 17 passed under the notched or undercut portion 15. With the screw 19 in register with the elongated opening 20, the outer end portion of the part 14 is pressed to its seat in the slot 12, the free end of the spring 17 being bowed or buckled sufficiently to pass it into the opposite notched or cut-out portion 15, as illustrated in Fig. 4. The screws 19 and 21 are then given a quarter turn to positively lock the two arms together, these screws in connection with the spring, operating to prevent any possible looseness between the arms or the working of one upon the other. In order that the disengagement of the free end of the spring 17 may be easily performed when the two arms are to be detached, I provide a notch 22 in the edge of the groove 16, adjacent to the free end of the spring. In this notch a screw driver or other equivalent device may be inserted for prying the spring outwardly.

The modified form of the invention shown in Figs. 6 and 7, is in all respects the same as the construction described except that the spring 17, and the groove 16 in which it seats, are omitted, as also the undercut portions 15 in the arm 10, to receive the ends of the spring. Further, instead of undercutting or dovetailing the outer edge of the groove 13 only, this dovetailing is continued across the slot 12, and a locking screw 23 is threaded in the arm 10 and is arranged in such proximity to the slot that its head in one position will overlie and bear on the portion 14 of the arm 11 when the latter is seated in the slot 12, this screw, like the screw 21, having a flattened portion to admit of the removal and insertion of the portion 14 of the arm 11 when desired.

Having thus described my invention, I claim as new and desire to secure by Letters Patent:

1. A square having two separable arms, one of the arms having a longitudinal slot isolated from the outer edges thereof, and provided with a groove at one side extending from the slot through the inner side edge of the arm, said slot being relatively wider at the side of the square having the groove than at the opposite side, the other arm having an end portion to fit into said slot and groove and provided with an elongated opening, and a revoluble member engaged in the bottom of the groove, having a head, in one position adapted to pass through said opening and in another position adapted to lock the two arms of the square together.

2. A square having two separable arms, one of the arms having a longitudinal slot and provided with a groove at one side extending from the slot through the inner side edge of the arm, the other arm having an end portion to seat on the edges of the slot and fitting into the groove, and a screw threaded into one of the arms, having a head extending farther from the body of the screw at one point than at another, to admit when in one position of the assembling and disassembling of the arms, and in another position overlying and bearing on the other arm and locking the two arms together.

3. A square having two separable arms, one of the arms having a longitudinal slot and provided with a groove at one side extending from the slot through the inner side edge of the arm, the other arm having an end portion fitting within the slot and groove and seating on the edges of a head, and a screw threaded into the arm having the slot adjacent to the slot and groove, the said head extending farther from the body of the screw at one point than another to admit when in one position of the assembling and disassembling of the arms, and in another position adapted to bear on the portion of the arm fitting within the groove and slot.

4. A square having two separable arms, one of the arms having a longitudinal slot isolated from the outer edges thereof and provided with a groove at one side extending from the slot through the inner side edge of the arm, the other arm having an end portion to fit into the said slot and groove and seat on the edges of the slot, and a flat spring engaging at its ends with the arm having the slot, and bearing on said end portion of the arm and locking the two arms together.

5. A square having two separable arms, one of the arms having a longitudinal slot isolated from the outer edges thereof and provided with a groove at one side extending from the slot through the inner side edge of the arm, said slot being relatively wider at the side of the square having the groove than at the opposite side and having notches at the ends, the other arm having an end portion to fit into said slot and groove, and a flat spring attached to the said end portion of the last mentioned arm and having the ends thereof arranged to engage in said notches and lock the two arms together.

6. A square comprising two separable arms, one of the arms having a longitudinal slot and the other arm having an end portion adapted to fit into said slot and seat on the edges thereof, said end portion of the arm having a longitudinal channel, the bottom of which tapers downwardly from an intermediate point toward each end, and a spring secured within said channel, having projecting end portions to engage with the other arm of the square and lock the two arms together.

In testimony whereof I have signed my name to this specification in the presence of two subscribing witnesses.

THOMAS C. HOWLAND.

Witnesses:
 PHINEAS PROCTOR,
 GEORGE C. JONES.